United States Patent [19]

Schwab

[11] Patent Number: 4,494,341
[45] Date of Patent: Jan. 22, 1985

[54] DOCK SHELTER WITH IMPROVED ADJUSTABLE HEAD PAD

[75] Inventor: James M. Schwab, Waukesha, Wis.

[73] Assignee: Kelley Company Inc., Milwaukee, Wis.

[21] Appl. No.: 412,018

[22] Filed: Aug. 26, 1982

[51] Int. Cl.³ .......................... E04H 14/00; E06B 1/00
[52] U.S. Cl. ................................. 52/173 DS; 160/191
[58] Field of Search ............ 52/173 DS, 204; 49/200; 160/190, 191

[56] References Cited

U.S. PATENT DOCUMENTS

| 2,033,893 | 3/1936 | White | 160/191 |
| 2,041,221 | 5/1936 | Brunst | 160/191 |
| 2,090,146 | 8/1937 | Pixley | 160/191 |
| 2,607,410 | 8/1952 | McKee | 160/191 |
| 2,703,247 | 3/1955 | Wolf et al. | 160/191 |
| 2,926,728 | 3/1960 | Johannsen et al. | 160/191 |
| 3,230,675 | 9/1963 | Frommelt et al. | 52/173 |
| 3,375,625 | 4/1968 | Edkins et al. | 52/173 DS |

OTHER PUBLICATIONS

Series AH Adjustable Head.
Fairborn Industries Inc., "Foam Truck Seal".
McGuire TS-583 100/116, "Adjustable Loading Door Seals".
Chalfont Dor-Seals.
Frommelt Industries Inc., "Foam-Fit Truck Dock Pads".

Primary Examiner—Alfred C. Perham
Attorney, Agent, or Firm—Andrus, Sceales, Starke & Sawall

[57] ABSTRACT

A dock shelter having an improved adjustable head pad. The dock shelter borders a doorway in a dock wall and is adapted to be engaged by the rear end of a truck body to provide a weather seal around the doorway. The dock shelter includes a pair of vertical pads that extend along the sides of the doorway and a vertically adjustable head pad that extends horizontally across the upper end of the doorway. Cables are attached to the respective ends of the head pad and extend upwardly, are trained over a freely movable double pulley and are dead-ended on a fixed structure. The double pulley is connected through an extension spring to the supporting structure, so that the force of the spring acts to urge the head pad upwardly and counterbalance the weight of the head pad. The counterbalancing mechanism insures precise vertical adjustment of the head pad and prevents racking or cocking of the head pad during adjustment.

6 Claims, 6 Drawing Figures

DOCK SHELTER WITH IMPROVED ADJUSTABLE HEAD PAD

BACKGROUND OF THE INVENTION

Dock shelters are employed to provide a weather seal between the rear end of a truck body and a loading dock. In general, the conventional dock shelter includes a pair of vertical side pads formed of a compressible material which are located on either side of the doorway in the dock. Extending across the upper end of the doorway is a compressible head pad. As the truck back toward the dock the rear end of the truck body engages the pads, compressing them and providing a weather seal between the truck body and the dock.

As the vertical height of the roof of a truck body can vary considerably, movable head pads have been employed to accommodate the variance in roof height. A mechanism for adjusting the vertical height of the head pad is shown in U.S. Pat. No. 3,230,675. In that patent elongated guide rods are attached to opposite sides of the head pad and the guide rods slide within tracks on a fixed frame attached to the dock. Counterbalancing weights are connected through cables to opposite ends of the head pad to counterbalance the weihgt of the head pad. The head pad is raised and lowered manually and the counterbalancing weights will retain the head pad in the desired vertical position.

The adjustable head pad mechanism as shown in U.S. Pat. No. 3,230,675 has certain disadvantages. As each side of the head pad is connected to an independent counterbalancing mechanism, there is a tendency for the head pad to rack or cock as it is moved vertically which can result in jamming of the guide mechanism. Furthermore, the swinging counterweights are exposed on the deck wall and can be a hazard to workers.

It has been found that in service, the weight of the head pad may change considerable due to the absorption of water, and with the construction shown in the aforementioned patent, the counterbalancing weights cannot be readily changed to compensate for the change in weight of the head pad.

As a further difficulty, with the construction shown in the aforementioned patent, there is no mechanism for precise leveling of the head pad on installation, other than changing the magnitude of the respective counterweights.

SUMMARY OF THE INVENTION

The invention is directed to an improved adjustable head pad for a dock shelter. In accordance with the invention, the head pad extends horizontally between the upper ends of the side pads and cables are attached to the ends of the head pad and extend upwardly over a pulley arrangement which includes a freely floating double pulley. Both cables are trained over the double pulley and the double pulley is connected through an extension spring to the frame of the dock shelter. The force of the spring acts to urge the head pad upwardly and counterbalance the head pad weight.

The head pad can be manually raised and lowered to the desired height and is held in that position by the counterbalancing effect of the spring. As the counterbalancing force of the spring is connected to both cables through the double pulley, the forces on opposite ends of the head pad are equalized to thereby minimize racking or cocking of the head pad as it is moved vertically.

As a further advantage, the force of the spring can be readily varied to thereby compensate for a change in weight of the head pad, due to water absorption, by merely changing the location of attachment of the spring to the supporting frame.

As the head pad adjusting mechanism does not require freely swinging counterbalancing weights there is less hazard to the workers.

As a further aspect of the invention, one of the cables is connected to the supporting frame through a turnbuckle, and through manual operation of the turnbuckle, precise leveling of the head pad can be achieved on installation.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figures 1, 2:
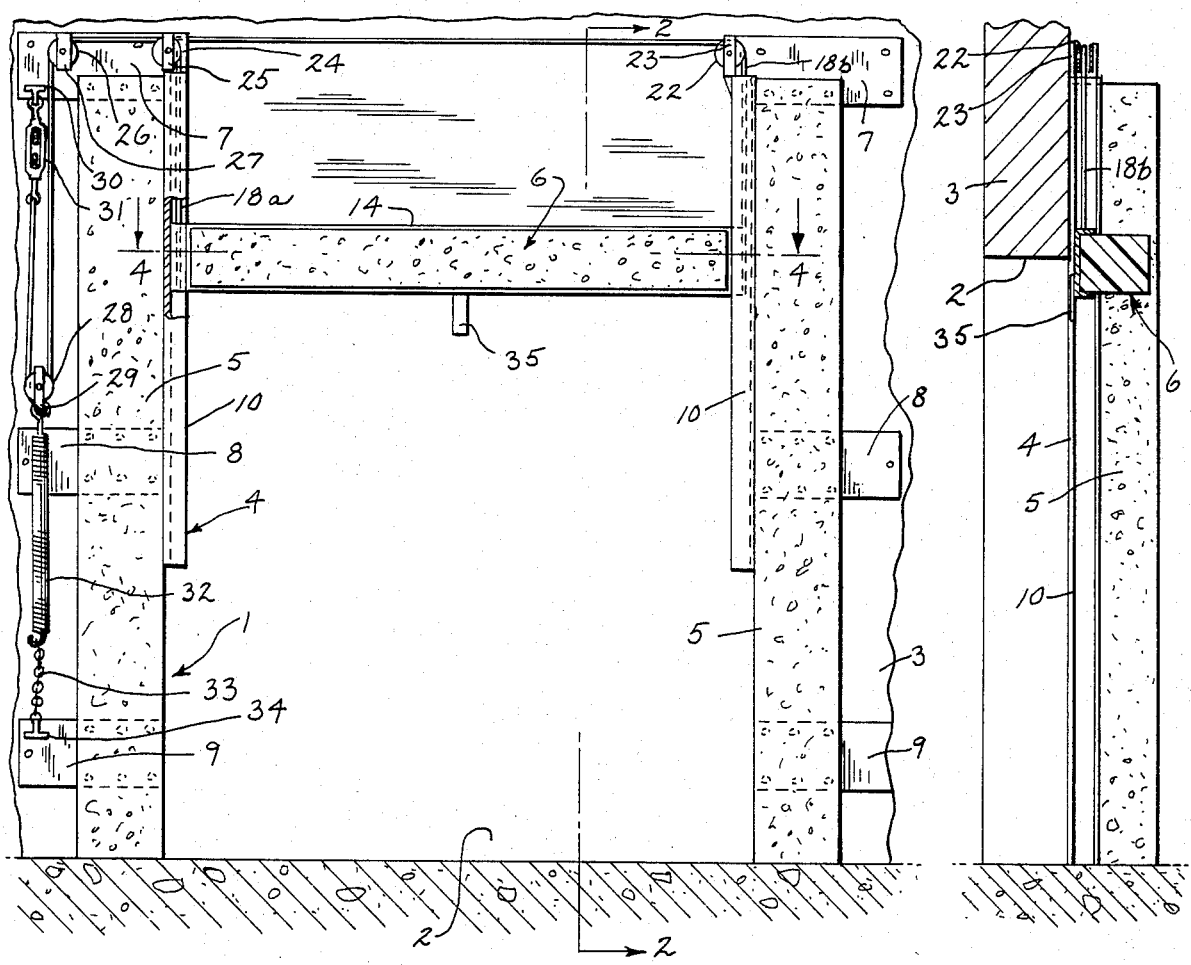
FIG. 1 is a front elevation of a loading dock incorporating the dock shelter of the invention.
FIG. 2 is a vertical section taken along line 2—2 of FIG. 1.

FIG. 1 shows a dock shelter 1 mounted alongside a doorway or opening 2 in a dock wall 3. The doorway 2 is normally enclosed by an overhead door, not shown, and during a loading operation the door will be opened and the rear end of a truck body will engage the dock shelter to provide a weather seal between the truck body and the dock.

The dock shelter, in general, includes a frame or supporting structure 4 which is mounted on the dock wall 3, a pair of side pads 5 that are attached to frame 4 and are mounted along the sides of doorway 2, and a horizontal head pad 6 which extends between the upper ends of side pads 5.

Figure 3:
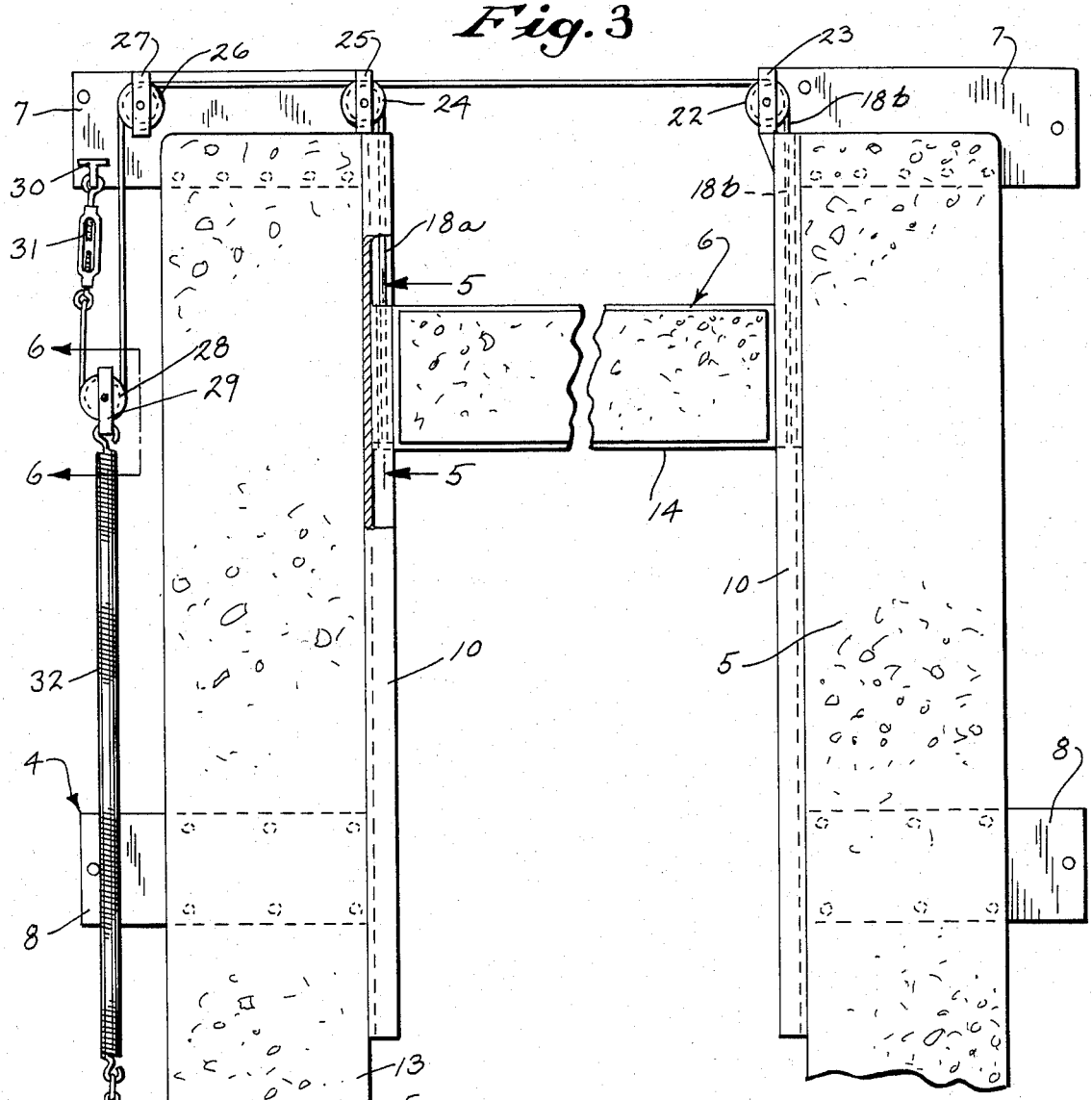
FIG. 3 is an enlarged fragmentary front elevation of the mechanism for adjusting the position of the head pad.

Frame 4 includes a pair of upper plates 7, a pair of intermediate plates 8, and a pair of lower plates 9, all of which are mounted through anchor bolts to the dock wall 3. Connecting the upper and intermediate plates 7 and 8 along each side of the doorway 2, is a guide channel 10 which is located along the side of doorway 2. Each side pad 5, as shown in FIG. 3, includes a backing plate 11 which is mounted to plates 7, 8 and 9, an intermediate compressible core 12 formed of foam plastic, or the like, and an outer fabric covering 13.

Figure 4:
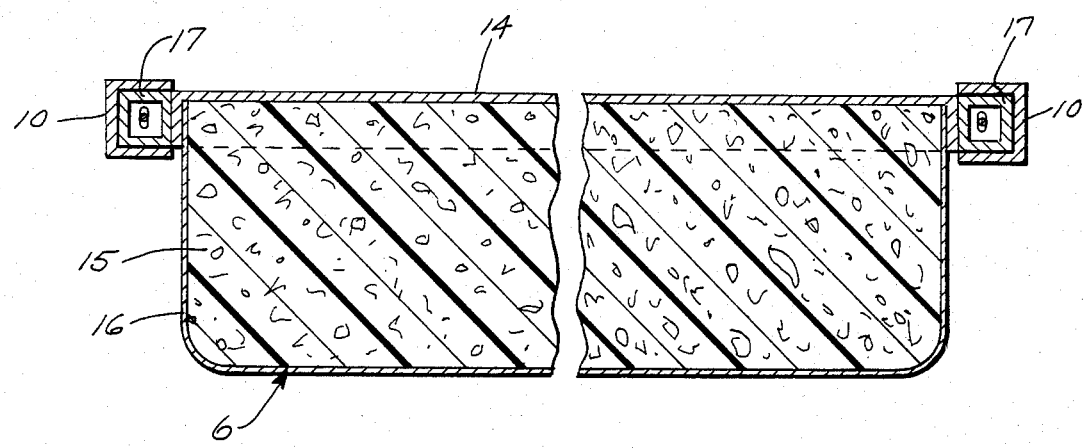
FIG. 4 is a horizontal section of the head pad.
Figure 5:
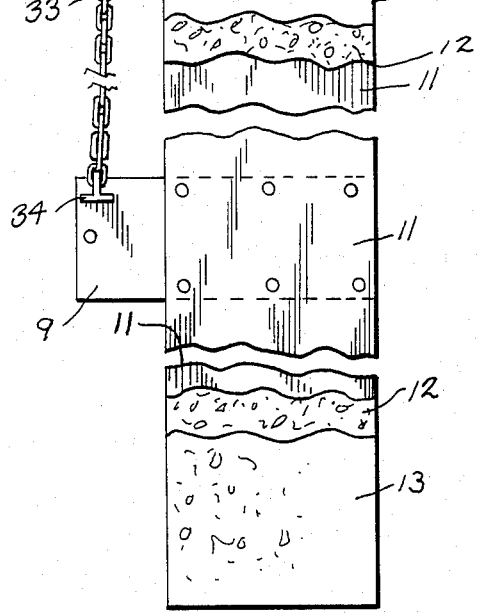
FIG. 5 is a section taken along line 5—5 of FIG. 3.
Figure 5:
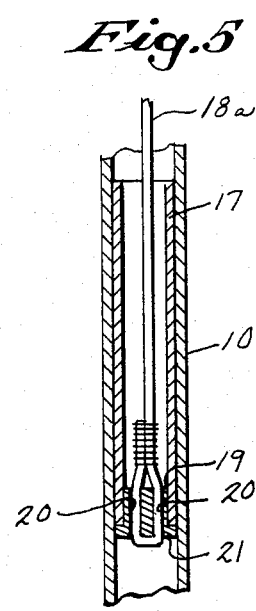
Figure 6:
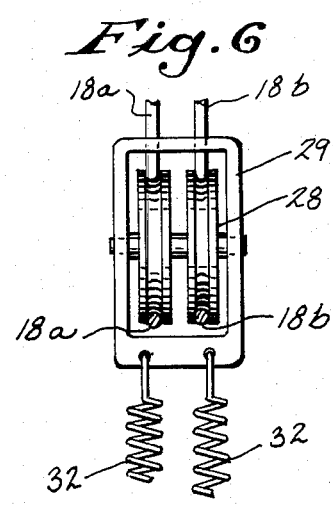
FIG. 6 is a section taken along line 6—6 of FIG. 3 and showing the floating double pulley.

As best shown in FIGS. 4–6, head pad 6 includes a shallow open-ended metal pan 14 which receives a core 15 of compressible material, such as foam plastic. A fabric or plastic waterproof covering 16 is located around core 15.

To guide the head pad 6 in vertical movement, a generally rectangular guide tube 17 is welded, or otherwise secured, to the side edges of pan 14 and the guide tubes 17 are adapted to ride within the guide channels 10, as shown in FIGS. 4 and 5, as the head pad is raised and lowered.

In accordance with the invention, a counterbalancing system is associated with head pad 6 to counterbalance the weight of the head pad. In this regard, the counterbalancing system includes a pair of cables 18a and 18b, each of which extends downwardly through the respective guide tube 17, and the lower end of each cable is attached to a cap 19 located at the lower end of the guide tube 17. As best shown in FIG. 5, the end of cable 18a extends within the central opening in cap 19 and is threaded through holes 20 in the based of the cap and is joined to the cable to provide a firm connection between the cable and the cap. Cable 18b is similarly attached to cap 19. As shown in FIG. 5, each cap 19 is provided with an outwardly extending flange 21 which engages the lower end of the guide tube 17.

As shown in FIG. 3, cables 18 and 18b extend vertically from the head pad. Cable 18b passes over pulley 22 which is mounted through bracket 23 to frame 4. Cable 18b then extends horizontally, and both cables 18a and 18b pass over a double pulley 24 which is mounted through bracket 25 to plate 7 of frame 4. Both cables 18a and 18b extend over double pulley 26 which is mounted by bracket 27 to plate 7 and then extend downwardly and are trained over a floating double pulley 28 carried by bracket 29. After passing around the double pulley 28 cables 18 and 18b extend upwardly and are dead ended on the upper plate 7 of frame 4 at 30.

An adjustable turnbuckle 31 can be connected in one or both cables 18a and 18b to adjust the effective length of the cable and thus precisely level head pad 6 on installation.

Counterbalancing springs 32 are connected between bracket 29 and chains 33 which are dead-ended on lower plate 9 at 34. The force of springs 32 urges the bracket 29 downwardly and thus serves to counterbalance the weight of head pad 6.

Strap 35 is attached to the pan 14, and by manually pulling downwardly on the strap, the head pad can be lowered. By pushing upwardly, the head pad can be raised to any desired elevation and the counterbalancing springs 32 will act to hold the head pad at the desired vertical height.

Due to the pulley arrangement, the guide bracket 29 and double pulley 28 will move only one-half the amount of travel of the head pad 6 and this small amount of movement will not appreciably change the spring force so that the springs 32 will effectively counterbalance the weight of the head pad in all positions. Various other pulley arrangements can be incorporated to provide any desired movement of the floating pulley 28 with respect to the movement of the head pad.

As the counterbalancing force exerted by springs 32 acts against the double pulley 28 which carries both cables 18a and 18b, the force applied to opposite ends of the head pad 6 will be equalized, thereby minimizing rack or cocking of the head pad as it is raised and lowered.

The turnbuckle 31 can be used to precisely level the head pad when the unit is installed. Adjustment of the turnbuckle will act to shorten or lengthen the length of one of the cables to thereby precisely align the head pad in a horizontal attitude.

The counterbalancing force can be readily varied by engaging the lower end of the springs 32 with a different link of chains 33. Even though the head pad may be equipped with a waterproof cover, it has been found in practice that there may be leakage of water or moisture into the core, resulting in a substantial change in weight of the head pad. With the invention, this change of weight can be readily accommodated by changing the connection between the springs 32 and the chains 33, which in effect provides a convenient manner of changing the counterbalancing force.

With the drawings have illustrated the use of cables in the counterbalancing mechanism, it is contemplated that other flexible members, such as chains, can be utilized. In addition, the particular positioning of the pulleys and cables is not critical and any arrangement can be utilized in which the counterbalancing force is operably connected with a double pulley that carries both of the cables or flexible members.

Various mode of carrying out the invention are contemplated as being within the scope of the following claims particularly pointing out and distinctly claiming the subject matter which is regarded as the invention.

I claim:

1. A dock shelter comprising a supporting structure attached to the dock wall, a pair of vertical side pads bordering a doorway in said dock wall, a head pad extending horizontally between the side pads, a pair of cables, one end of each cable being connected to the supporting structure and the opposite end of each cable being attached to the respective side edges of the head pad, pulley means mounted on the supporting structure for supporting said cables in movement and including a pair of pulleys mounted for rotation on a common shaft, said pulley means being disposed for free floating movement with respect to the supporting structure, guide means connected to the supporting structure for guiding the head pad in vertical movement, said guide means comprising a tubular member connected to each vertical side edge of said head pad, and a pair of guideways mounted on the supporting structure and disposed to receive the respective tubular member, said opposite end of each cable extending through the respective tubular member and being attached to the bottom end of said tubular member, and counterbalancing means connected to said pulley means for urging said pulley means downward to counterbalance the weight of the head pad.

2. The dock shelter of claim 1, wherein said head pad includes a shallow-open-ended pan and a compressible pad disposed within the pan, said tubular members being attached to the side edges of said pan.

3. The dock shelter of claim 1, wherein said pulley means also includes a third pulley disposed in vertical alignment and above the location of attachment of a first of said cables to said head pad, said first cable being trained over said third pulley, a fourth pulley disposed in vertical alignment and above the location of attachment of a second of said pair of cables to said head pad, said second cable being trained over said fourth pulley, said pair of pulleys being disposed between the connection of said cables to said supporting structure and said third and fourth pulleys.

4. The dock shelter of claim 1, wherein said counterbalancing means comprises spring means interconnecting the pulley means with the supporting structure, and including means for varying the force of said spring means to thereby vary the counterbalancing effect.

5. The dock shelter of claim 4, wherein the means for varying the force of said spring means comprises means for varying the location of attachment of said spring means to said supporting structure.

6. A dock shelter comprising, a supporting structure attached to the dock wall, a pair of vertical side pads bordering a doorway in a dock wall, a head pad extending horizontally between the side pads, a pair of cables, one end of each cable being connected to the supporting structure and the opposite end of each cable being attached to the respective side edges of the head pad, pulley means including a pair of pulleys mounted for rotation on a common shaft, each pulley supporting one of said cables, said pulley means being disposed for free floating movement with respect to the supporting structure, counterbalancing means connected to said pulley means for urging said pulley means downwardly to counterbalance the weight of said head pad, guide means connected to the supporting structure for guiding the head pad in vertical movement, said guide means including a pair of guideways disposed adjacent opposite sides of said doorway on said supporting structure, and a vertically extending tubular member connected to each side edge of the head pad and disposed to move within the respective guideways, each cable extending through the corresponding tubular member, and connecting means for connecting the cable to the lower end of the respective tubular member.

* * * * *